United States Patent
Maini (10) Patent No.: US 8,789,036 B2
(45) Date of Patent: Jul. 22, 2014

(54) DEVICE SOFTWARE CUSTOMIZATION

(75) Inventor: Kamaljeet Maini, Houston, TX (US)

(73) Assignee: QUALCOMM Incorporated, San Diego, CA (US)

( * ) Notice: Subject to any disclaimer, the term of this patent is extended or adjusted under 35 U.S.C. 154(b) by 726 days.

(21) Appl. No.: 12/863,140

(22) PCT Filed: Mar. 7, 2008

(86) PCT No.: PCT/US2008/003101
§ 371 (c)(1),
(2), (4) Date: Jul. 15, 2010

(87) PCT Pub. No.: WO2009/091370
PCT Pub. Date: Jul. 23, 2009

(65) Prior Publication Data
US 2010/0293364 A1  Nov. 18, 2010

Related U.S. Application Data

(60) Provisional application No. 61/021,655, filed on Jan. 17, 2008.

(51) Int. Cl.
*G06F 9/445* (2006.01)
*G06F 9/44* (2006.01)

(52) U.S. Cl.
USPC ............ 717/175; 717/170; 717/172; 717/174

(58) Field of Classification Search
CPC ..................................... G06F 8/61; G06F 8/65
See application file for complete search history.

(56) References Cited

U.S. PATENT DOCUMENTS

| | | | | |
|---|---|---|---|---|
| 7,219,343 | B2 * | 5/2007 | Almeida et al. | 717/172 |
| 7,243,347 | B2 * | 7/2007 | Palmer et al. | 717/170 |
| 7,614,051 | B2 * | 11/2009 | Glaum et al. | 717/175 |
| 8,122,447 | B2 * | 2/2012 | Cohen et al. | 717/175 |
| 2002/0107959 | A1 | 8/2002 | Shteyn | |
| 2003/0070156 | A1 | 4/2003 | Van Rens | |
| 2003/0182563 | A1 * | 9/2003 | Liu et al. | 713/191 |
| 2005/0081198 | A1 * | 4/2005 | Cho et al. | 717/174 |
| 2005/0235281 | A1 * | 10/2005 | Lefrancois | 717/175 |
| 2006/0195839 | A1 * | 8/2006 | Lin et al. | 717/174 |
| 2006/0212691 | A1 * | 9/2006 | Wood et al. | 713/1 |
| 2012/0023491 | A1 * | 1/2012 | Gattegno | 717/175 |

FOREIGN PATENT DOCUMENTS

| WO | WO 01/42952 | 6/2001 |
|---|---|---|
| WO | WO 02/23376 | 3/2002 |

OTHER PUBLICATIONS

International Searching Authority, International Search Report and The Written Opinion, 10 pages, Oct. 2008.

* cited by examiner

*Primary Examiner* — Thuy Dao
(74) *Attorney, Agent, or Firm* — Kilpatrick Townsend & Stockton LLP (57) ABSTRACT

Systems, methods, and other embodiments associated with device software configuration are described. One example method is executed by a personal electronic device (PED) having a read only memory (ROM) configured with a boot loader, a BASE ROM partition, and a customization file store partition (CFSP). The method includes receiving a customization package and storing it in the CFSP. The method includes invoking a one-time installation process to customize PED software, settings, characteristics, and so on, based on the CFSP contents. The method includes invoking a boot-time installation process to configure a file system filter driver on the PED to control access to CFSP contents based, at least in part, on a file attribute associated with the CFSP content.

20 Claims, 5 Drawing Sheets

DEVICE SOFTWARE CUSTOMIZATION

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Computing power continues to be extended into smaller and more varied devices. Cellular telephones, personal digital assistants (PDAs), handheld gaming systems, navigation devices, and so on, continue to exhibit more and more computer-like properties. For example, these devices may run a version(s) of a general purpose operating system. These types of devices may sometimes be referred to as personal electronic devices (PEDs). These types of devices may also be referred to as "mobile devices."

One characteristic of a PED or mobile device is that its user and/or owner may want it to be customized. Customization may be desired because each user may want their own unique experience with their device. The customization desire may come from the individual user level, an organization level, a regional level, and so on. For example, a first user may want their computing device to run a first set of applications (e.g., personal productivity) while a second user may want their computing device to run a second set of applications (e.g., gaming). Similarly, one organization (e.g., parcel delivery business) may want their PEDs to run shipping and delivery applications while another organization (e.g., grocery store) may want their PEDs to run inventory and order entry applications. Additionally, both organizations may want to ensure that their PEDs do not run games or browsers.

There are three main areas of customization: application customization, look and feel customization, and settings customization. Application customization concerns establishing the set of applications, drivers, operating system modules, and so on, that are available on a device. Look and feel customization concerns establishing odors, user interface characteristics, and so on. Settings customization concerns establishing wireless networking parameters, and so on. Therefore, customizing a PED may include installing a desired set of applications, installing custom applications, configuring device settings, and so on. In one example, device settings may be stored in an XML file. Customizing a PED may also include fine tuning the look and feel of a device (e.g., display colors, display language, soft button location). More generally, customizing a device (e.g., PED) may include adding or modifying device software to meet user requirements. In some examples, customizing may even include removing existing applications from a base distribution associated with the device.

Conventionally, device manufacturers may have customized devices using a "unique ROM" approach. Unique ROMs may have been prepared at the region, organization, locale, operation, user, and other levels. The unique ROM approach has experienced issues with cost, complexity, ROM space wastage, SKU (stock keeping unit) proliferation, and so on. Additionally, customization using the unique ROM approach and/or other conventional approaches has typically been dependent on the device manufacturer and thus unavailable and/or inaccessible to the person(s) seeking the customization.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

A personal electronic device (PED) includes at least a ROM and a processor. A mobile device (e.g., cellular telephone, PDA) is an example of a PED. A PED typically includes a display, an input device (e.g., keypad, touchscreen, touchwheel), and an external communication device (e.g., USB port, wireless connection). The display may display a set of soft keys using a configurable language, odor, position, and so on. A PED may run a set of software. The PED may be customized using example systems and methods described herein. For example, the set of software available to a PED may be customized by example systems and methods described herein. The PED may also have a controllable look and feel that is configured by example systems and methods. Configurable settings associated with the PED may also be configured by example systems and methods described herein. These settings may include, for example, communication settings (e.g., wireless parameters), security settings (e.g., encryption), and so on.

A PED may be configured with a ROM having a customization file store partition (CFSP). A partition refers to a boundary aligned area of ROM that can be individually updated. An RUU (ROM Update Utility) facilitates updating a partition on a ROM. The ROM in an example PED may also include a boot loader, a BASE ROM partition(s), and a user partition(s). The CFSP is a partition that may store both "system" files and "user" files. System files may be distinguished from user files based, at least in part, on the file attributes. The CFSP may store software files, settings files, data files, and so on. Access to the CFSP may be controlled in example systems and methods by a file system filter driver (FSFD). The control may be based, at least in part, by FSFD interpretation of file attributes. In different examples, the CFSP may be persistent across cold boot, clean boot, factory reset, master reset, and RUU write unless explicitly updated.

In one example, a CFSP can be individually flashed by an RUU.

The PED may be configured with a customization installation logic that can customize the PED based on items placed into the CFSP. For example, the CFSP may receive a customization package that includes application files, setting files, and so on. After these items are loaded into the CFSP, the customization installation logic may reconfigure these items to make them "system" files that are considered, processed, consulted, and/or otherwise accessed during a boot process. In this way, downloaded files that may initially have been considered "user files" may become "system files".

The customization package may be produced by a system and/or method that is available to a third party other than the PED and/or ROM manufacturer. Thus, a user (e.g., individual, organization, enterprise) may place "user" items into the CFSP and have a run-once customization installation process convert the user items to "system" items. Access to the CFSP and/or to "system" items may be controlled by the FSFD. The FSFD may control access to files in the CFSP based, at least in part, on file attributes associated with files in the CFSP. Thus, the run-once customization installation process may reconfigure file, so that the FSFD will subsequently be able to control access to those fifes. In one example, the reconfiguring may include manipulating file attribute values. For example, a user file in the CFSP may be converted to system file in the CFSP by changing its archive attribute bit. The FSFD may subsequently interrogate the archive bit to determine whether to grant access (e.g., read, write, delete) to the item whose archive bit was manipulated.

Once the system items have been established, a customization engine in the PED ROM may treat the files as system files that are loaded, run, consulted, and/or otherwise, accessed during a boot process. These system files may no longer be accessible at the user level.

The PED ROM may store system files, application files, data files, settings files, XML provisioning files, digitally signed configuration files, and so on. These items may be placed into a ROM by a device provider and/or by a ROM provider. File attributes are a set of bits that can be set and evaluated to control access to files. File attributes include, for example, a read-only bit, a hidden bit, a system bit, volume label bit, a directory bit, and an archive bit. While the bits are named and have conventional usage, the bits may be interpreted in different ways, by different drivers for different purposes. Thus, file attribute bits can be retasked and/or re-interpreted.

Defining certain terms and terminology may facilitate subsequent discussion of the example systems and methods described herein. Thus, the following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment example necessarily includes that particular feature, structure, characteristic, property, element or limitation. Furthermore, repeated use of the phrase "in one embodiment" does not necessarily refer to the same embodiment, though it may.

PED: personal electronic device.
ROM: read only memory.
ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

PED ROM refers to a ROM having a device boot loader, a base ROM partition, and a CFSP. A PED ROM may also include a user store partition.

BASE ROM refers to a PED ROM configured with applications and settings common to a set of instances of the device. The applications may include, for example, an operating system, a productivity application, a utility, a driver, and so on. The settings may include, for example, local language, display parameters, communication parameters, security settings, and so on.

Customized ROM refers to a PED ROM after customization. The customized ROM may include the BASE ROM plus customized settings, customized applications, and soon. A customized ROM may not have some applications from a BASE ROM since some applications may be deleted during device software customization.

Customization Package refers to a set of applications, settings files, and so on to bet installed in the CFSP to support device software customization.

FSFD (file system filter driver) refers to a driver available on the PED. The FSFD may contain a driver that supports customizing files associated with a PED ROM. The FSFD may also include a driver mounted on the CFSP at device boot time. The FSFD may also contain a driver that protects system files by intercepting file operations and blocking certain operations (e.g., delete, find, or write) based on the value(s) of a file attribute(s). The FSFD may also contain a driver that does not block file operations on user files. A driver that differentiates between system files and user files based on the value(s) of a file attribute(s) (e.g., archive bit) may also be included in the FSFD. A driver that requires a digitally signed configuration file to convert a user file(s) to a system file(s) and to convert a system file(s) to a user file(s) may also be included in the FSFD.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside, within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used, herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically to linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
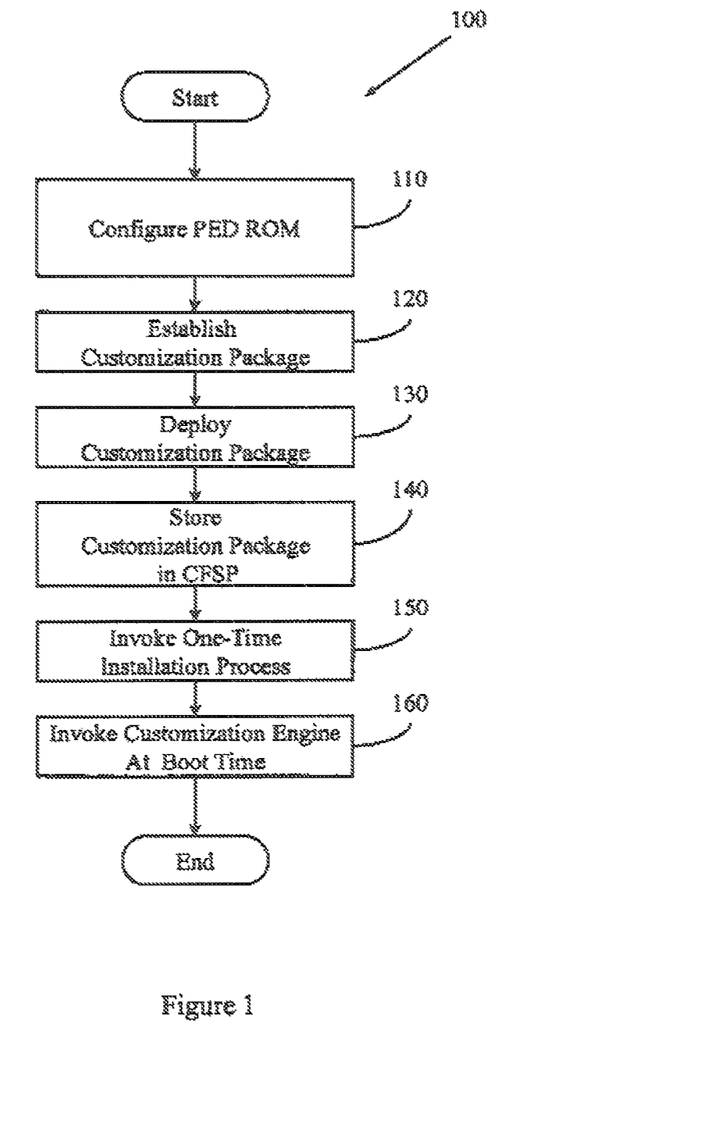
FIG. 1 illustrates an example method associated with PED software customization.

FIG. 1 illustrates a method 100 associated with device software customization. Method 100 may include, at 110, configuring a PED ROM with a boot loader, a base ROM partition, and a CFSP. Method 100 may also include, at 120, establishing the ROM customization package to be used in the PED. The ROM customization package may be loaded with application specific instructions or code. The customization package may include a set of application files and a set of settings files.

In one example, the CFSP may store a software application file, a settings file, an XML provisioning file, and/or a digitally signed configuration file and thus the customization package may include a similar set of items.

Method 100 may also include, at 130, deploying the customization package to the PED ROM. Deploying the customization package may include downloading a set of files or instructions from a 3$^{rd}$ party application available to a third party other than the PED or ROM manufacturer.

Method 100 may also include, at 140, controlling the PED to store the customization package in the CFSP. The customization package may contain the information to configure the PED. The PED may be configured to run a specific application not determined by the manufacturer of the PED or ROM. The PED may also be configured with settings and attributes established by a party other than the manufacturer of the PED or ROM. In one example, method 100 includes selectively controlling the PED to not store the customization package in the CFSP in the PED ROM based, at least in part, on a determination of the size of the customization package. For example, if the customization package is too large for the PED ROM, then the customization package may not be stored to the CFSP.

Method 100 may also include, at 150, invoking a one-time-installation process. The one-time installation process may reconfigure the boot loader, base ROM partition, system files, user files, and/or programs. Reconfiguring the systems files and/or user files may include, for example, manipulating file attribute bits so that an FSFD will treat the files differently. In one example, the CFSP is to be persistent across a cold boot, a dean boot, a factory reset, a master reset, and a RUU write unless specifically updated. In one example, the CFSP may be flashed individually.

Method 100 may also include, at 160, invoking the customization engine when the PED boots. The customization engine may cause the PED to configure itself based on the customization package and information available in the CFSP.

More generally, the actions described at 150 and 160 may be referred to collectively as invoking an installation process on the PED. This installation process may include a pre-installation operation, an installation operation, and a post-installation operation. In one example, the installation process is to control a file system filter driver (FSFD) to selectively convert a user file to a system file by manipulating a user file attribute value. In another example, the installation process is to control the FSFD to selectively convert a system file to a user file by manipulating a system file attribute value.

In one example, the FSFD operates, after customization when the PED operates. The FSFD controls access to the CFSP. In one example, the FSFD controls access to the CFSP by intercepting a file system operation whose target resides in the CFSP and selectively blocking the file system operation. The operation is blocked based, at least in part, on the value of a file attribute associated with the target.

Different boot modes may be available for a PED. Therefore, method 100 may also include establishing the type of boot process the PED is to perform. The boot process may be, for example, a cold boot or a warm boot. The different types of boots may have different sets of instructions and/or process to perform. For example, a cold boot process may include loading a cold boot link file. The cold boot process may also include copying the cold boot link file to the startup folder. Once the cold boot link file is copied to the startup folder the PED may launch the files stored in this folder. A warm boot sequence may include loading a warm boot process link file. The warm boot process may include performing different instructions than when a cold boot occurs. The difference may arise, for example, if the PED did not power off completely before the warm boot. The warm boot process may also include copying the warm boot process link file to the startup folder. Upon copying the warm boot process link file, the PED may launch the files in the startup folder.

While FIG. 1 illustrates various actions occurring in serial, it is to be appreciated that various actions illustrated in FIG. 1 could occur substantially in parallel. By way of illustration, a first process could configure the PED with the boot and base ROM partition, a second process could configure the CFSP, and a third process could establish a customization package. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 100. While executable instructions associated with the above method are described as being stored on a computer-readable medium, it is to be appreciated that executable instructions associated with other example methods described herein may also be stored on a computer-readable medium.

Figure 2:
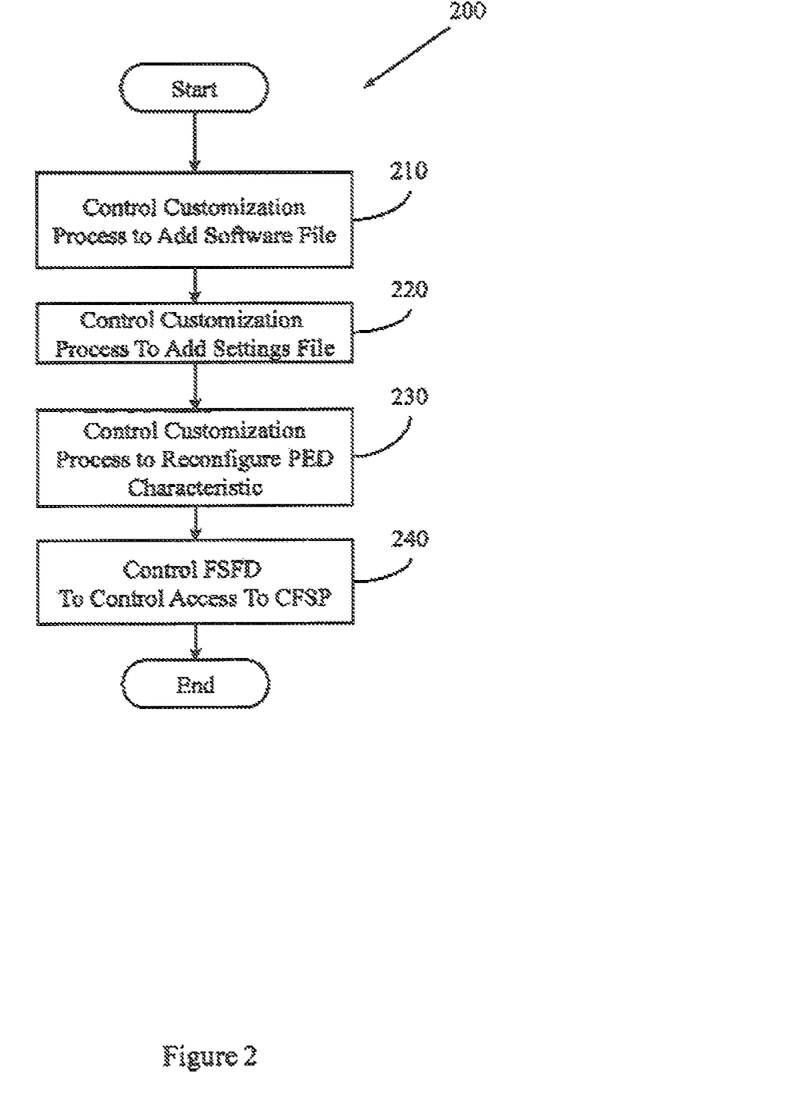
FIG. 2 illustrates another example method associated with PED software customization.

FIG. 2 illustrates a method 200 associated with device software customization. Method 200 may include, at 210, controlling a customization process running on a PED to add a software file to a CFSP on a ROM in the PED. Controlling the customization process may include, for example, making a remote procedure call, invoking a method in an object, sending a signal to a customization process, and so on. The software file may be, for example, a user file, a system file, en application file, and so on. A software file may be added to achieve a user-desired customization. For example, an organization may desire all of its PEDs to run a particular word processor and thus files associated with the word processor may be added at 210.

Method 200 may also include, at 220, controlling the customization process running on the PED to add a settings file to the CFSP on the ROM in the PED. Once again, controlling the customization process may include making a procedure call, invoking a method, providing a signal, and so on. The settings file may hold settings associated with, for example, user interface color, user interface language, the position of soft buttons, communication parameters, security, and so on.

Method 200 may also include, at 230, controlling a customization process to reconfigure a PED characteristic(s) based, at least in part, on the settings file. PED characteristics may include, for example, wireless communication characteristics, user interface characteristics, security characteristics, and so on.

Method 200 may also include, at 240, controlling an FSFD to control access to the CFSP. Controlling the FSFD may include, for example, setting a value in a registry, writing a value to an FSFD control variable, providing a signal to the FSFD, and so on. The FSFD may control access to the CFSP to limit usage of CFSP contents to authorized users. In one example, the FSFD controls access to a file in the CFSP based, at least in part, on a file attribute associated with the file in the CFSP. The file attribute may be, for example, a read-only bit, a hidden bit, and so on. Different instances of an FSFD may control access based on different attribute bits.

In one example, method 200 may also include controlling the customization process to selectively remove a software file from the ROM in the PED. A file may be removed to achieve a user-desired configuration where certain files are not to be included on the PED. For example, an organization may not want a PED to be able to run a competitor's software. In another example, an organization may not want a PED to run a browser.

Figure 3:
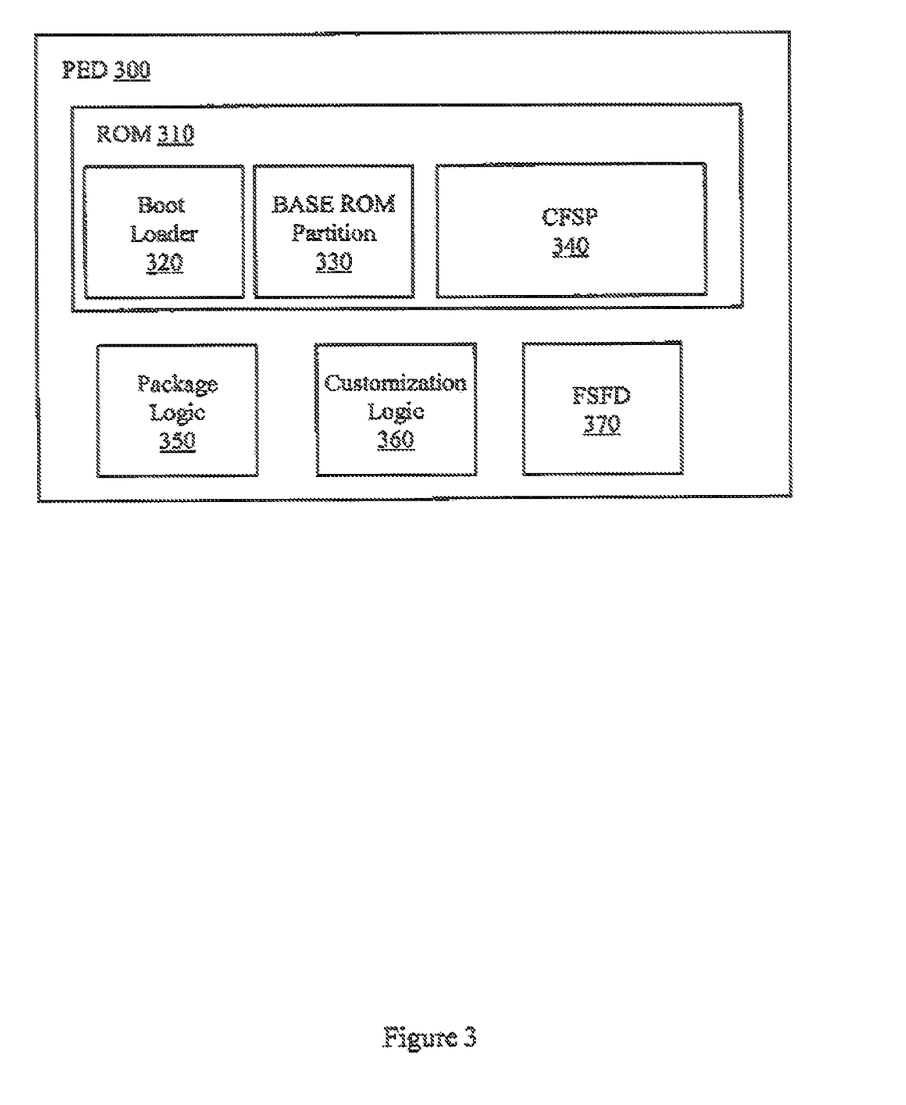
FIG. 3 illustrates an example system associated with device software customization.

FIG. 3 illustrates a PED 300 that includes a ROM 310. The ROM 310 may include a boot loader 320 configured to determine the logic or processes performed at startup (e.g., boot). The ROM 310 may also include a BASE ROM partition 330. The BASE ROM partition 330 may contain instructions, settings, processes, and so on that are consulted, and/or processed on system start up. The BASE ROM partition 330 may contain files, settings, processes, and so on that will be used regardless of other customizations made to the ROM 310 (e.g., customized code, customized boot process). Thus the BASE ROM partition 330 may store applications and so on that are initially common to all instances of a PED configured with the BASE ROM partition 330.

The ROM 310 may also include a CFSP 340. The CFSP 340 may contain operating parameters, processes, instructions, settings, files, and so on that can be customized and that can in turn customize PED 300. For example, the CFSP 340 may contain programs that users other than the manufacturer can store in the PED 300 based on the particular application desired. The boot loader 320 may contain instructions that will examine files in the CFSP 340 that have been customized for a certain application or process. In different examples, the customization may be detectable based on file attribute bits, on a header associated with a file, on an entry in a data store describing customizations, and so on.

PED 300 may also include a package logic 350. The package logic 350 may prepare a customization package that contains processes, files, applications, and so on to be deployed to the CFSP 340 and to be configured as applications, system files, and so on. While the package logic 350 is illustrated in PED 300, it is to be appreciated that a package may be produced outside the PED 300 and provided to the PED 300. Thus, the customization package may be received by the PED 300. In one example, the customization package may be received from the manufacturer of the PED), from the manufacturer of ROM 310, from a third party, from a user, from an organization purchasing the PED 300, and so on. Thus, PED 300 may be customized by preparing a customization package that can be processed by the deployment logic 360. The package logic 350 may read the customization package and perform the actual moving of files, installing applications, and so on.

PED 300 may also include a customization logic 360. The customization logic 360 may store items from the customization package in CFSP 340. The customization logic 360 may also manipulate file attribute bits to establish certain flies as system files. The customization logic 360 may copy files from a hard drive, flash drive, or other media based on logic or processes in the CFSP 340. The customization logic 260 may perform a one-time customization upon receiving a customization package. The boot loader 320 may perform a pre-boot customization process at each boot. The boot loader 320 may perform different pre-boot customizations based on whether the boot is a warm boot or cold boot.

PED 300 may also include an FSFD 370. The FSFD 370 may control access to items (e.g., system files) in FSFD 370. System files may be processed, examined, and otherwise considered by boot loader 320 when PED 300 is booted. For example, the boot loader 320 may run a certain system file based on a particular end user application. In one example, once the boot loader 320 runs the system file predetermined number of times, the FSFD 370 may set an attribute to prevent the boot loader 320 from performing that task during subsequent boot operations.

Boot loader 320 may include customized processes and/or instructions to follow after the one-time customization performed by customization logic 360 has taken place. The boot loader 320 may read certain file attributes and determine that the customization has taken place and proceed to invoke these customized processes and/or instructions. The boot loader 320 may, in connection with FSFD 370, produce a customized instance of PED 300. The customized instance may include customization of software available on PED 300, customization of the look and feel of PED 300, customization of settings (e.g., wireless communication parameters) associated with PED 300, and so on.

In one example, the boot loader 320, and/or other logics in PED 300, may compare the size of the CFSP 340 and the size of a customization package. Based on the comparison the boot loader 320 and/or other logics in PED 300 may only selectively perform certain customizations, and so on.

In one example, PED 300 may determine whether the PED 300 is performing a warm boot or a cold boot. In one example, the boot loader 320 may perform this determination. A warm boot may require that the PED 300 perform a different set of instructions compared to a cold boot.

Figure 4:
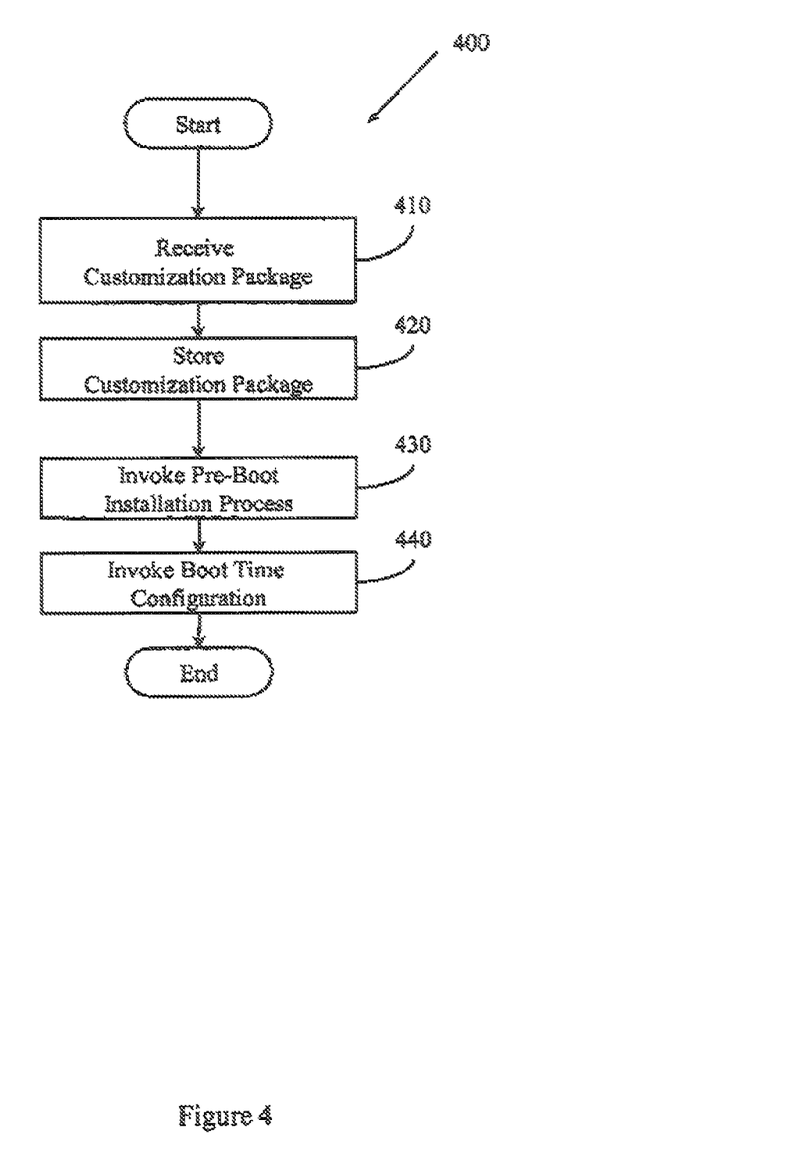
FIG. 4 illustrates an example method associated with device software customization.

FIG. 4 illustrates a method 400 associated with device software customization. Method 400 may be performed by a PED having a ROM configured with a boot loader, a BASE ROM partition, and a CFSP. Method 400 includes, at 410, receiving a customization package to be deployed to the CFSP. Receiving the customization package may include, for example, receiving a file, receiving a set of records, receiving a data stream, and so on.

Method 400 may also include, at 420; selectively storing elements of the customization package in the CFSP. Storing the elements may include, for example, decrypting an element and writing it to the CFSP, unzipping an element and writing it to the CFSP, providing a data stream to a CFSP writer, and so on.

Method 400 also includes, at 430, invoking, a pre-boot installation process on the PED to customize software available on the PED. The customization is based, at least in part, on the customization package in the CFSP. The customization may include, for example, adding a file to the CFSP, removing a file from the CFSP, changing a user file in the CFSP to a system file by manipulating a file bit processed by an FSFD, and so on. This customization may be a one time process.

Method 400 may also include, at 440, invoking a boot-time configuration process on the PED to configure an FSFD to control access to the CFSP. In one example, the FSFD is to control access to a file in the CFSP based, at least in part, on a file attribute associated with the file in the CFSP. For example, the FSFD may allow access to user files that are identified as user files by a first setting for a first file attribute bit while the FSFD may not allow access to system files that are identified as system files by a second setting for that file attribute bit. This boot-time customization may be performed upon each boot of the PED.

In one example the CFSP may store a software application file, a settings file, an XML provisioning file, and/or a digitally signed configuration file. The CFSP may be persistent across a cold boot, a clean boot, a factory reset, a master reset, and a RUU write unless specifically updated. The CFSP may be flashed individually.

In one example, the pre-boot installation process may include adding a software file to the CFSP, adding a setting file to the CFSP, and/or reconfiguring a PED characteristic(s) based, at least in part, on the setting file. In one example, the pre-boot installation process may in include selectively converting a user file to a system file by manipulating a user file attribute value associated with the user file.

Figure 5:
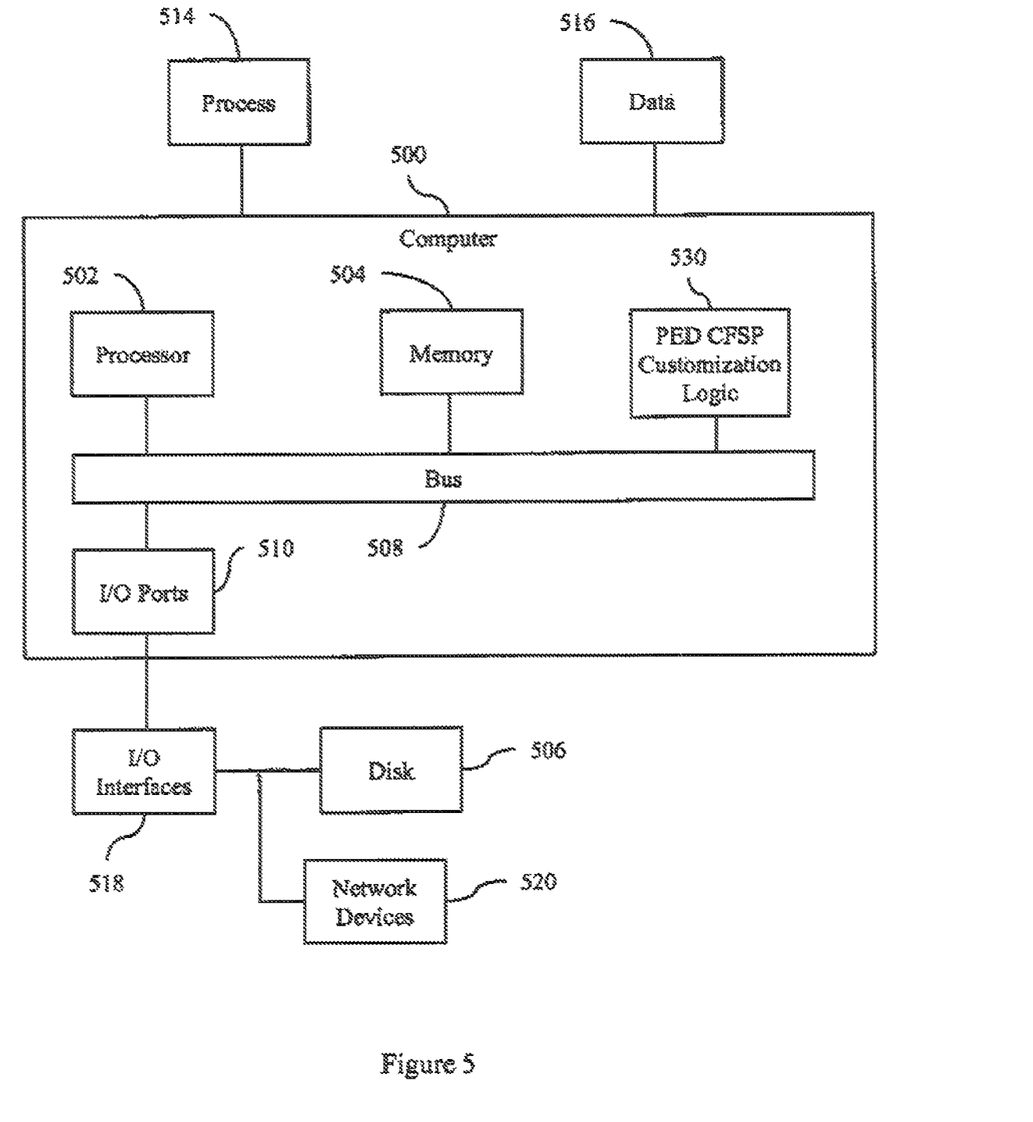
FIG. 5 illustrates an example system associated with device customization.

FIG. 5 illustrates an example computing device in which example systems and methods described herein, and equivalents, may operate. The example computing device may be a computer 500 that includes a processor 502, a memory 504, and input/output ports 510 operably connected by a bus 508. Computer 500 may be a portion of, for example, a personal digital assistant, a cellular telephone, a global positioning system device, personal music player, and so on. In one example, the computer 500 may include a PED CFSP customization logic 530 configured to facilitate producing a user-customizable PED. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Thus, logic 530 may provide means (e.g., hardware, software in execution, firmware) for configuring a ROM to include a boot loader, a BASE ROM partition, and a customization file store partition (CFSP). Configuring the ROM may include, for example, writing the ROM, flashing the ROM, partitioning the ROM, and so on. The logic 530 may also include means (e.g., hardware, software in execution, firmware) for configuring a PED with the ROM. The configuring may include, for example, informing the PED that the ROM has been configured with the boot loader, BASE ROM partition, CFSP, and so on. The logic 530 may also include means (e.g., hardware, software in execution, firmware) for providing a customization package to the CFSP in the PED). The providing may include, for example, writing data to a predetermined location, writing a file to a known location, providing a stream of data, and so on. The logic 530 may also include means for customizing the PED based, at least in part, on the customization package in the CFSP. The customizing may include, for example, manipulating file attribute bits, adding a file, removing a file, adding a setting, changing a setting, and so on.

The different means may be implemented, for example, as an ASIC programmed to control computer 500 without involving processor 502. The different means may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 519. Input/output devices may be, for example, a keyboard, a microphone, a pointing and selection device, cameras, video cards, displays, the disk 508, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modem Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
    configuring a personal electronic device (PED) read only memory (ROM) with a boot loader, a BASE ROM partition, and a customization file store partition (CFSP);
    establishing a customization package to be associated with the CFSP;
    deploying the customization package to the PED ROM;
    controlling the PED to store the customization package in the CFSP in the PED ROM;
    invoking an installation process on the PED, where the installation process converts a user file of the customization package stored in the CFSP to a system file; and producing a customized instance of the PED, where the customized instance customizes software available on the PED based on the customization package stored in the CFSP.

2. The method of claim 1, where the CFSP is to store one or more of, a software application file, a settings file, an XML provisioning file, and a digitally signed configuration file.

3. The method of claim 1, where the CFSP is to be persistent across a cold boot, a clean boot, a factory reset, a master reset, and a RUU write unless specifically updated, and where the CFSP may be flashed individually.

4. The method of claim 1, where the customization package includes a set of application files and a set of settings files.

5. The method of claim 1, where the installation process is to perform a pre-installation operation, an installation operation, and a post-installation operation.

6. The method of claim 1, where the installation process is to control a file system filter driver (FSFD) to selectively convert the user file to the system file by manipulating an attribute value of the user file.

7. The method of claim 6, where the installation process controls the FSFD to selectively convert a system file to a user file by manipulating an attribute value of the system file.

8. The method of claim 6, where the FSFD controls access to the CFSP.

9. The method of claim 8 where the FSFD controls access to the CFSP by intercepting a file system operation whose target resides in the CFSP and selectively blocking the file system operation based, at least in part, on the value of a file attribute associated with the target.

10. The method of claim 1, including selectively controlling the PED to not store the customization package in the CFSP in the PED ROM based, at least in part, on a determination of the size of the customization package.

11. The method of claim 1, where the CFSP is to be individually updated, and store user files and system files.

12. The method of claim 1, where deploying the customization package to the PED ROM includes deploying the customization package to the PED ROM without deleting the BASE ROM partition.

13. A personal electronic device (PED), comprising:
a read only memory (ROM) comprising:
a boot loader;
a BASE ROM partition; and
a customization file store partition (CFSP);
a package logic to receive a customization package and to deploy the customization package to the CFSP;
a customization logic to produce a customized instance of the PED based, at least in part, on the customization package in the CFSP; and
a file system filter driver (FSFD) to control access to a file stored in the CFSP on the PED based, at least in part, on a file attribute associated with the file.

14. The PED of claim 13, where the customization logic is to selectively manipulate a file attribute associated with a file received in the customization package and stored in the CFSP to make the file eligible for selective protection by the FSFD.

15. The PED of claim 14, where the customization logic is to selectively manipulate one or more of, a property of a user interface employed by the PED, and a setting that controls an operating characteristic of the PED.

16. The PED of claim 13, where the boot loader is to perform a first boot-time customization for a cold boot of the PED and is to perform a second, different boot-time customization for a warm boot of the PED.

17. The PED of claim 13, where the customization logic is to manipulate an attribute value of the file stored in the CFSP to convert the file to a system file.

18. The PED of claim 13, where the CFSP is to be individually updated, and store user files and system files.

19. The PED of claim 13, where the package logic is to deploy the customization package without deleting the BASE ROM partition.

20. A hardware computing system, comprising:
means for configuring a read only memory (ROM) to include a boot loader, a BASE ROM partition, and a customization file store partition (CFSP);
means for configuring a personal electronic device (PED) with the ROM;
means for providing a customization package to the CFSP in the PED; and
means for producing a customized instance of the PED based, at least in part, on the customization package in the CFSP.

* * * * *